(No Model.) 3 Sheets—Sheet 1.

M. KILLACKY & T. MADDEN.
DUMPING WAGON.

No. 565,545. Patented Aug. 11, 1896.

Witnesses.
Francis H. Miller
J. E. Carroll

Inventors.
Martin Killacky
Thomas Madden
by George E. Buckley
Their Attorney.

(No Model.) 3 Sheets—Sheet 2.

M. KILLACKY & T. MADDEN.
DUMPING WAGON.

No. 565,545. Patented Aug. 11, 1896.

Witnesses.
Francis H. Miller
J. E. Carroll

Inventors.
Martin Killacky
Thomas Madden
by George E. Buckley
their Attorney.

(No Model.) 3 Sheets—Sheet 3.

M. KILLACKY & T. MADDEN.
DUMPING WAGON.

No. 565,545. Patented Aug. 11, 1896.

Witnesses. Inventors.
Francis H. Miller Martin Killacky
P. E. Carroll Thomas Madden
per George E. Buckley
their Attorney.

UNITED STATES PATENT OFFICE.

MARTIN KILLACKY AND THOMAS MADDEN, OF PHILADELPHIA, PENNSYLVANIA.

DUMPING-WAGON.

SPECIFICATION forming part of Letters Patent No. 565,545, dated August 11, 1896.

Application filed June 10, 1896. Serial No. 595,058. (No model.)

*To all whom it may concern:*

Be it known that we, MARTIN KILLACKY and THOMAS MADDEN, citizens of the United States, and residents of Philadelphia, Pennsylvania, have invented certain new and useful Improvements in Carrying and Dumping Vehicles, of which the following is a full, clear, and exact description, reference being had to the accompanying drawings.

The nature of our invention will appear from the following description and claims.

It has for its object the provision of a cart or vehicle for carrying coal and other merchandise, which can be run close to a curbstone at the side of a street and dump its load sidewise upon or over the sidewalk, but which vehicle while discharging its load will not interfere with traffic on the middle of a street of ordinary width; in fact, which in a street of ordinary width will not deter the passage of street-cars the tracks of which are located at or about the middle space of the highway.

Figure 1:
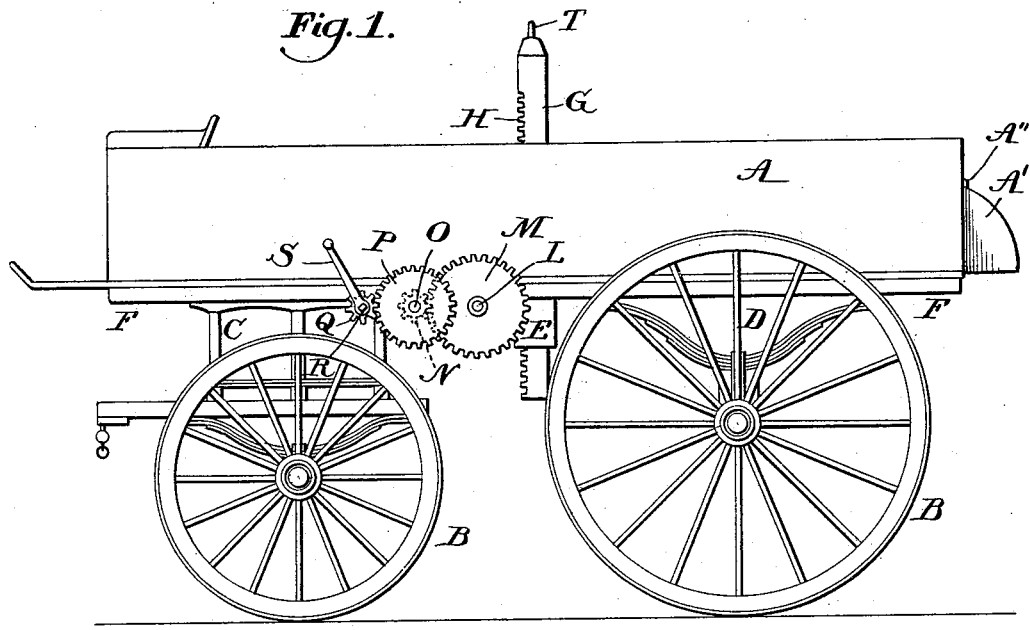
Figure 2:
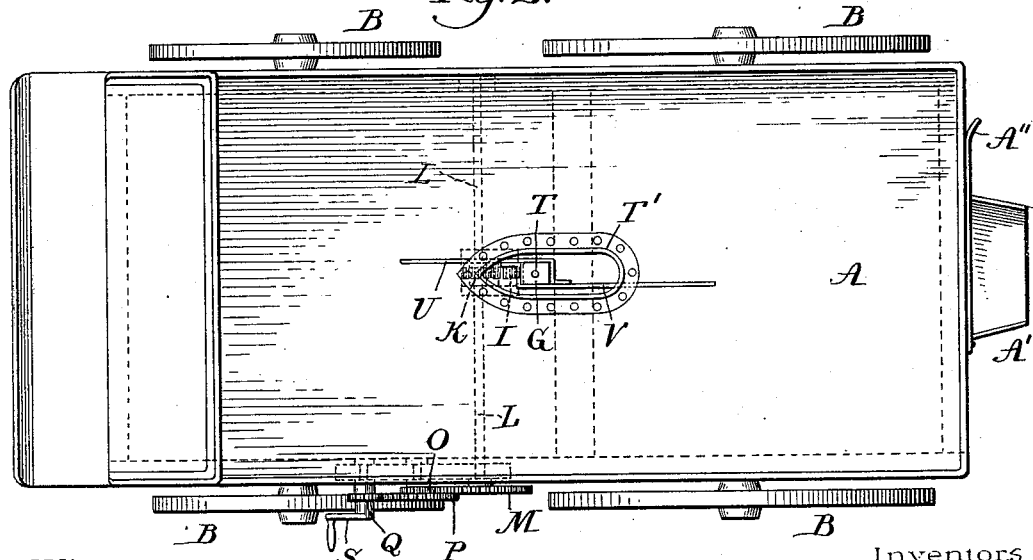
Figure 3:
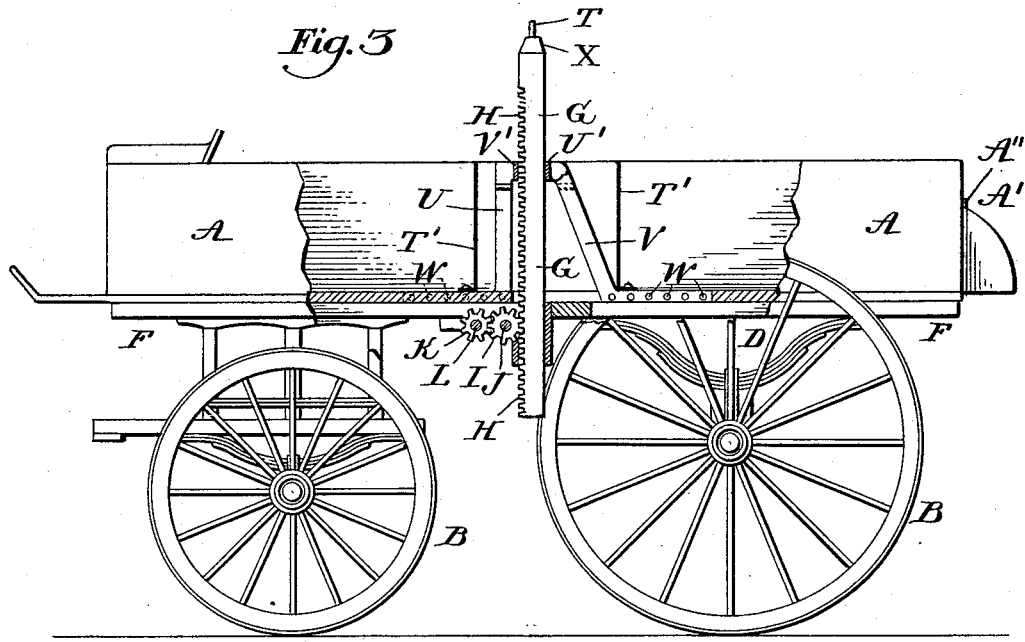
Figure 4:
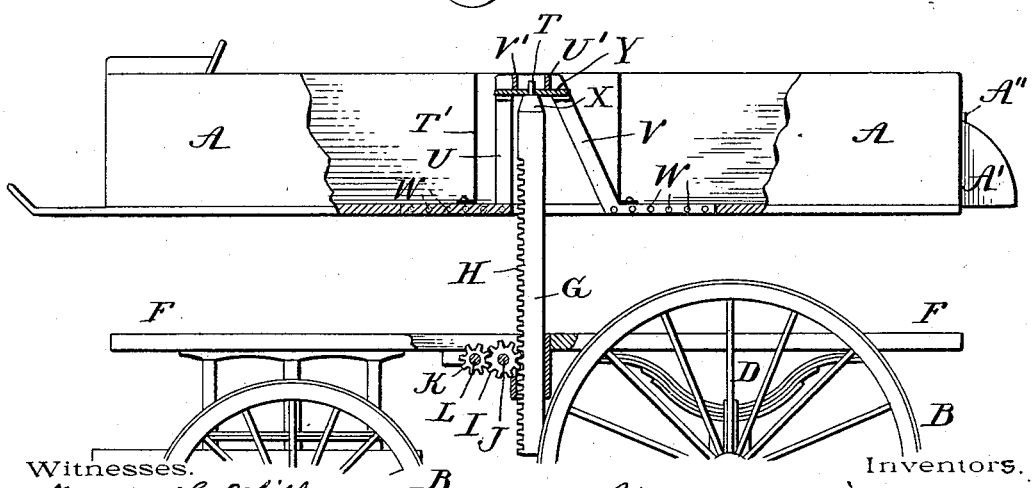
Figure 5:
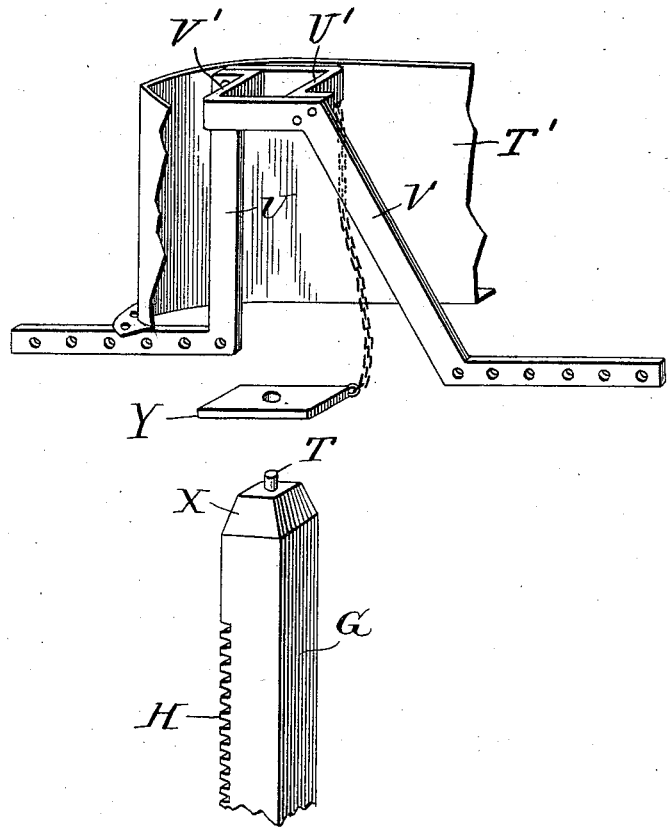

In the drawings, Figure 1, Sheet 1, is a side elevation of a four-wheeled coal-cart to which my invention has been applied, and Fig. 2 a plan view of the same. Fig. 3, Sheet 2, is a side elevation of a cart, partly broken away to show the interior arrangement of the raising and shifting mechanism; and Fig. 4, a similar view showing the body of the cart in an elevated position ready for shifting. Fig. 5, Sheet 3, is a detached perspective view of the standards or braces adapted to receive the upward push of the cog-rack. This view also shows the cap and pivot on top of the cog-rack and the brace-plate.

A is the body of the cart; B B, the wheels thereof; C, the truck; D, one of the ordinary springs, and E a sleeve set vertically in the frame F. This frame F is mounted upon the springs D and the truck C. The mounting of a frame, or even of a flooring, of a wagon upon an "axle" or "axles," sustained by springs or trucks, is well known to all those mechanics who are skilled in the art of wagon manufacture.

G is an upright cog-rack adapted to slide upward and downward in the sleeve E.

H H are cog-teeth in the rack G.

I is a cog-wheel engaging with the teeth H of cog-rack G, set upon a short shaft or gudgeon J.

K is a cog-wheel engaging the cog-wheel I and mounted upon shaft L.

M is a cog-wheel rigidly mounted on the end of shaft L, outside of the side of frame F.

N is a cog-wheel mounted on a short shaft O, and engaging wheel M. P is a companion cog-wheel to wheel N, mounted upon the same shaft O. Q is a cog-wheel also, the teeth of which engage with those of wheel P, and it is mounted upon a short shaft R. The shaft R is the point at which we apply our power, and it is revolved by the crank or lever S.

All the parts heretofore described are attached directly or indirectly to the frame F, as shown.

It will be seen that a movement of the crank S will raise or lower the cog-rack G. Now the box A contains the coal or other merchandise to be dumped. It is our object to raise and turn this box, which, for convenience in movement upon roads, is longer than it is wide.

We now approach the point of our invention.

U is an upright standard. V is an inclined standard. Both these standards are secured to the bottom of the box A by screws or bolts W W.

X is a cap on rack G, surmounted by and sustaining a pin or pivot T.

Y is a brace-plate provided with opening Y', by which this plate is adapted to set over the pivot T and upon cap-piece X of the cog-rack G.

U' V' are cross-pieces integral with the standards U V, respectively.

T' is a sheet-metal guard around the standards U V to prevent the coal and dust from interfering with the action of the cog-rack G.

The operation is as follows: When the cart is loaded, the box A and rack G are in the position shown in Fig. 1, Sheet 1. We will say it is a load of coal. The wagon or cart is now driven beside a curb at the place where the load is to be delivered, the wagon and wheels being side on to the curbstone. Crank S (see Figs. 1 and 2) is now turned until the rack G is run down below the position shown in Fig. 4. Brace-plate Y is now placed on the pivot T, which projects through the hole Y'. The rack-bar G is now raised until plate Y abuts against the lower edges of the bars U' V', and the operation of raising is continued until the box A, with its load of coal, is raised to the position shown in Fig. 4, or until the box A is raised until its bottom is above the plane of the upper edges of the tires of the wheels. The box is then swung around on pivot T until the rear end, which is provided with the chute A' and closing-plate A'', is directed toward the point where the load is to be deposited. The pivot T is in or about in the middle of the cart. The rear end of the cart is now depressed by the operator throwing his weight upon it, or by applying his strength to raise the forward end, and the coal is conveyed from the chute A' by any of the means now well known to skilled mechanics.

The arrangement of gearing, as will be apparent to skilled mechanics, may be varied.

The opening Y' is larger in diameter than the pivot T, and is simply an opening designed to receive this pivot and permit sufficient play to allow the tilting of the box A.

Rack G constitutes a standard or support for the box A when the latter rests upon its apex.

What we claim is—

1. The combination of box A, frame F; the rack G, provided with cogs, H; pivot T; plate Y; provided with an opening Y', adapted to receive said pivot T, and of sufficient diameter to permit play to the pivot; whereby, the box A may be turned on said pivot and tilted to deliver the load; shaft L and crank S, with intermediate gearing to raise and lower the cog-rack, G, substantially as described.

2. The combination of box A; frame F; the rack G, provided with cogs H; pivot T; plate Y, provided with an opening Y', adapted to receive said pivot T; whereby, the box A may be turned on said pivot; shaft L and crank S with intermediate gearing to raise and lower the cog-rack G, substantially as described.

3. The combination of box A; frame F; standard G, provided with pivot T, setting in a recess or opening Y' in plate Y, beneath the box A; whereby, the latter may be turned upon said pivot, substantially as described.

In testimony whereof we have hereunto affixed our signatures in the presence of two subscribing witnesses.

MARTIN KILLACKY.
    THOMAS MADDEN.

Witnesses:
 GEORGE E. BUCKLEY,
 GEO. W. REED.